United States Patent
Yamamoto

(10) Patent No.: US 11,761,382 B2
(45) Date of Patent: Sep. 19, 2023

(54) FUEL SUPPLY DEVICE

(71) Applicant: IHI Corporation, Koto-ku (JP)

(72) Inventor: Yasuhiko Yamamoto, Tokyo (JP)

(73) Assignee: IHI Corporation, Koto-ku (JP)

(*) Notice: Subject to any disclaimer, the term of this patent is extended or adjusted under 35 U.S.C. 154(b) by 429 days.

(21) Appl. No.: 16/893,534

(22) Filed: Jun. 5, 2020

(65) Prior Publication Data

US 2020/0300170 A1 Sep. 24, 2020

Related U.S. Application Data

(63) Continuation of application No. PCT/JP2018/045478, filed on Dec. 11, 2018.

(30) Foreign Application Priority Data

Dec. 14, 2017 (JP) ................... 2017-239676

(51) Int. Cl.
| | | |
|---|---|---|
| *F02C 9/30* | (2006.01) | |
| *F02C 7/236* | (2006.01) | |
| *F02D 23/02* | (2006.01) | |
| *F23R 3/28* | (2006.01) | |

(52) U.S. Cl.
CPC ............... *F02C 7/236* (2013.01); *F02C 9/30* (2013.01); *F02D 23/02* (2013.01); *F23R 3/28* (2013.01)

(58) Field of Classification Search
CPC ............. F02D 29/04; F02C 9/30; F02C 7/236
See application file for complete search history.

(56) References Cited

U.S. PATENT DOCUMENTS

| | | | |
|---|---|---|---|
| 4,656,827 A | 4/1987 | Puillet | |
| 6,353,790 B1 | 3/2002 | Tsuzuki | |
| 2002/0038540 A1* | 4/2002 | Griffiths | .......... F02C 7/228 |
| | | | 60/734 |
| 2004/0255594 A1 | 12/2004 | Baino et al. | |
| 2005/0241318 A1 | 11/2005 | Buehman et al. | |
| 2010/0321030 A1* | 12/2010 | Gale | ............ F04D 13/06 |
| | | | 903/902 |
| 2016/0138473 A1* | 5/2016 | Veilleux, Jr. | ......... G05D 7/0682 |
| | | | 137/59 |

FOREIGN PATENT DOCUMENTS

| | | |
|---|---|---|
| DE | 699 03 623 T2 | 6/2003 |
| EP | 1 344 917 B1 | 12/2009 |
| EP | 3 040 277 A1 | 7/2016 |
| JP | 61-98929 A | 5/1986 |

(Continued)

*Primary Examiner* — Gerald L Sung
(74) *Attorney, Agent, or Firm* — Oblon, McClelland, Maier & Neustadt, L.L.P.

(57) ABSTRACT

A fuel supply device includes a first electric pump which discharges a fuel toward an engine at a first flow rate, a second electric pump which discharges the fuel at a second flow rate and merges the fuel discharged at the second flow rate with the fuel discharged at the first flow rate, a first control device which is configured to control the first electric pump, and a second control device which is configured to control the second electric pump, in which the first control device and the second control device control the first electric pump and the second electric pump such that a total flow rate of the first flow rate and the second flow rate is a fuel flow rate target value.

12 Claims, 2 Drawing Sheets

(56) References Cited

FOREIGN PATENT DOCUMENTS

| | | |
|---|---|---|
| JP | 5-157013 A | 6/1993 |
| JP | 10-89667 A | 4/1998 |
| JP | 2001-107751 A | 4/2001 |
| JP | 2004-143942 A | 5/2004 |
| JP | 2005-232980 A | 9/2005 |
| JP | 2015-47902 A | 3/2015 |
| WO | WO 94/20739 A2 | 9/1994 |
| WO | WO 2005/033491 A1 | 4/2005 |
| WO | WO 2015/033786 A1 | 3/2015 |

* cited by examiner

FUEL SUPPLY DEVICE

This application is a Continuation Application based on International Application No. PCT/JP2018/045478, filed on Dec. 11, 2018, which claims priority on Japanese Patent Application No. 2017-239676, filed on Dec. 14, 2017, the contents of which are incorporated herein by reference.

TECHNICAL FIELD

The disclosure relates to a fuel supply device.

BACKGROUND ART

The following Patent Document 1 discloses a fuel pump which supplies a fuel to a gas turbine. The fuel pump supplies a fuel using a gear pump whose rotating shaft is connected to an output shaft of the gas turbine via a gear box.

Patent Documents 2 to 4 disclose a fuel pump and a control device of a fuel pump.

CITATION LIST

Patent Document

[Patent Document 1] Japanese Unexamined Patent Application, First Publication No. 2005-232980
[Patent Document 2] Japanese Unexamined Patent Application, First Publication No. H05-157013
[Patent Document 3] Japanese Unexamined Patent Application, First Publication No. 2001-107751
[Patent Document 4] Japanese Unexamined Patent Application, First Publication No. H10-89667

SUMMARY OF THE INVENTION

Technical Problem

In the above-described fuel supply devices of the related art, the fuel is supplied to the gas turbine by one fuel pump which is rotationally driven by the gas turbine. Accordingly, for example, in a case where the fuel pump or the gear box fails, the fuel cannot be supplied. For example, when the fuel cannot be supplied, this may generate a problem in a case where the gas turbine is an engine of an aircraft.

The present disclosure is made in consideration of the above-described circumstances, and an object thereof is to provide a fuel supply device of an engine capable of securing more redundancy than that of the related art.

Solution to Problem (1) According to a first aspect of the present disclosure, there is provided a fuel supply device including: a first electric pump which discharges a fuel toward an engine at a first flow rate; a second electric pump which discharges the fuel at a second flow rate and merges the fuel discharged at the second flow rate with the fuel discharged at the first flow rate; a first control device which is configured to control the first electric pump; and a second control device which is configured to control the second electric pump, in which the first control device and the second control device are configured to control the first electric pump and the second electric pump such that a total flow rate of the first flow rate and the second flow rate is a fuel flow rate target value.

(2) In the fuel supply device of (1), the first control device and the second control device may be configured to control the first electric pump and the second electric pump according to a difference between an engine rotational speed obtained from the engine and an engine rotational speed target value.

(3) In the fuel supply device of (1), the first control device may be configured to control the first electric pump according to a difference between a drive current and a drive current target value of the first electric pump, and the second control device may be configured to control the second electric pump according to a difference between a drive current and a drive current target value of the second electric pump.

(4) In the fuel supply device of (1), the first control device may be configured to control the first electric pump according to a difference between a rotational speed and a rotational speed target value of the first electric pump, and the second control device may be configured to control the second electric pump according to a difference between a rotational speed and a rotational speed target value of the second electric pump.

(5) In the fuel supply device of (1), the fuel supply device may further include a flow rate measurement unit which measures the total flow rate, in which the first control device and the second control device may be configured to control the first electric pump and the second electric pump according to a difference between a measured value of the flow rate measurement unit and the fuel flow rate target value.

(6) In the fuel supply device of (1), the fuel supply device may further include a first flow rate estimation unit which acquires an estimated first flow rate which is an estimated value of the first flow rate, from a rotational speed of the first electric pump; and a second flow rate estimation unit which, acquires an estimated second flow rate which is an estimated value of the second flow rate, from a rotational speed of the second electric pump, in which the first control device and the second control device may be configured to control the first electric pump and the second electric pump according to a difference between the total flow rate of the estimated first flow rate and the estimated second flow rate, and the fuel flow rate target value.

(7) In the fuel supply device of (5), the first control device may include a scheduler, a first subtractor which is electrically connected to the scheduler and the engine, a controller which is electrically connected to the first subtractor, a second subtractor which is electrically connected to the controller and the flow rate measurement unit, a first flow rate control unit which is electrically connected to the second subtractor, a third subtractor which is electrically connected to the first flow rate control unit and the first electric pump, a first speed control unit which is electrically connected to the third subtractor, a fourth subtractor which is electrically connected to the first speed control unit and the first electric pump, and a first current control unit which is electrically connected to the fourth subtractor. The second control device may include the scheduler, the first subtractor, the controller, a fifth subtractor which is electrically connected to the controller and the flow rate measurement unit, a second flow rate control unit which is electrically connected to the fifth subtractor, a sixth subtractor which is electrically connected to the second flow rate control unit and the second electric pump, a second speed control unit which is electrically connected to the sixth subtractor, a seventh subtractor which is electrically connected to the second speed control unit and the second electric pump, and a second current control unit which is electrically connected to the seventh subtractor.

(8) In the fuel supply device of (7), the first subtractor may be configured to calculate a first difference between the engine rotational speed target value input from the scheduler and an engine rotational speed input from the engine, and output the first difference to the controller, the second subtractor may be configured to calculate a second difference between the fuel flow rate target value input from the controller and a fuel flow rate input from the flow rate measurement unit, and output the second difference to the first flow rate control unit, the third subtractor may be configured to calculate a third difference between a rotational speed target value input from the first flow rate control unit and a pump rotational speed input from the first electric pump, and output the third difference to the first speed control unit, the fourth subtractor may be configured to calculate a fourth difference between a drive current target value of the first electric pump input from the first speed control unit and a pump drive current input from the first electric pump, and output the fourth difference to the first current control unit, the fifth subtractor may be configured to calculate the second difference between the fuel flow rate target value input from the controller and the fuel flow rate input from the flow rate measurement unit, and output the second difference to the second flow rate control unit, the sixth subtractor may be configured to calculate a fifth difference between a rotational speed target value of the second electric pump input from the second flow rate control unit and a pump rotational speed input from the second electric pump, and output the fifth difference to the second speed control unit, and the seventh subtractor may be configured to calculate a sixth difference between a drive current target value of the second electric pump input from the second speed control unit and a pump drive current input from the second electric pump, and output the sixth difference to the second current control unit.

(9) In the fuel supply device of (6), the first control device may include a scheduler, a first subtractor which is electrically connected to the scheduler and the engine, a controller which is electrically connected to the first subtractor, a second subtractor which is electrically connected to the controller and a first adder, a first flow rate control unit which is electrically connected to the second subtractor, a third subtractor which is electrically connected to the first flow rate control unit and the first electric pump, a first speed control unit which is electrically connected to the third subtractor, a fourth subtractor which is electrically connected to the first speed control unit and the first electric pump, a first current control unit which is electrically connected to the fourth subtractor, the first flow rate estimation unit which is electrically connected to the first electric pump, and the first adder which is electrically connected to the first flow rate estimation unit and the second flow rate estimation unit. The second control device may include the scheduler, the first subtractor, the controller, a fifth subtractor which is electrically connected to the controller and a second adder, a second flow rate control unit which is electrically connected to the fifth subtractor, a sixth subtractor which is electrically connected to the second flow rate control unit and the second electric pump, a second speed control unit which is electrically connected to the sixth subtractor, a seventh subtractor which is electrically connected to the second speed control unit and the second electric pump, a second current control unit which is electrically connected to the seventh subtractor, the second flow rate estimation unit which is electrically connected to the second electric pump, and the second adder which is electrically connected the second flow rate estimation unit and the first flow rate estimation unit.

(10) In the fuel supply device of (9), the first subtractor may be configured to calculate a first difference between the engine rotational speed target value input from the scheduler and an engine rotational speed input from the engine, and output the first difference to the controller, the second subtractor may be configured to calculate a second difference between the fuel flow rate target value input from the controller and an estimated fuel flow rate input from the first adder, and output the second difference to the first flow rate control unit, the third subtractor may be configured to calculate a third difference between a rotational speed target value input from the first flow rate control unit and a pump rotational speed input from the first electric pump, and output the third difference to the first speed control unit, the fourth subtractor may be configured to calculate a fourth difference between a drive current target value of the first electric pump input from the first speed control unit and a pump drive current input from the first electric pump, and output the fourth difference to the first current control unit, the first adder may be configured to calculate a total value of the estimated first flow rate input from the first flow rate estimation unit and the estimated second flow rate input from the second flow rate estimation unit, and input the total value to the second subtractor, the fifth subtractor may be configured to calculate a fifth difference between the fuel flow rate target value input from the controller and an estimated fuel flow rate input from the second adder, and output the fifth difference to the second flow rate control unit, the sixth subtractor may be configured to calculate a sixth difference between a rotational speed target value input from the second flow rate control unit and a pump rotational speed input from the second electric pump, and output the sixth difference to the second speed control unit, the seventh subtractor may be configured to calculate a seventh difference between a drive current target value of the second electric pump input from the second speed control unit and a pump drive current input from the second electric pump, and output the seventh difference to the second current control unit, and the second adder may be configured to calculate the total value of the estimated second flow rate input from the second flow rate estimation unit and the estimated first flow rate input from the first flow rate estimation unit, and input the total value to the fifth subtractor.

According to the present disclosure, it is possible to provide a fuel supply device of an engine capable of securing more redundancy than that of the related art.

DETAILED DESCRIPTION OF THE EMBODIMENTS

Hereinafter, embodiments of the present disclosure will be described with reference to the drawings.

First Embodiment

Figure 1:
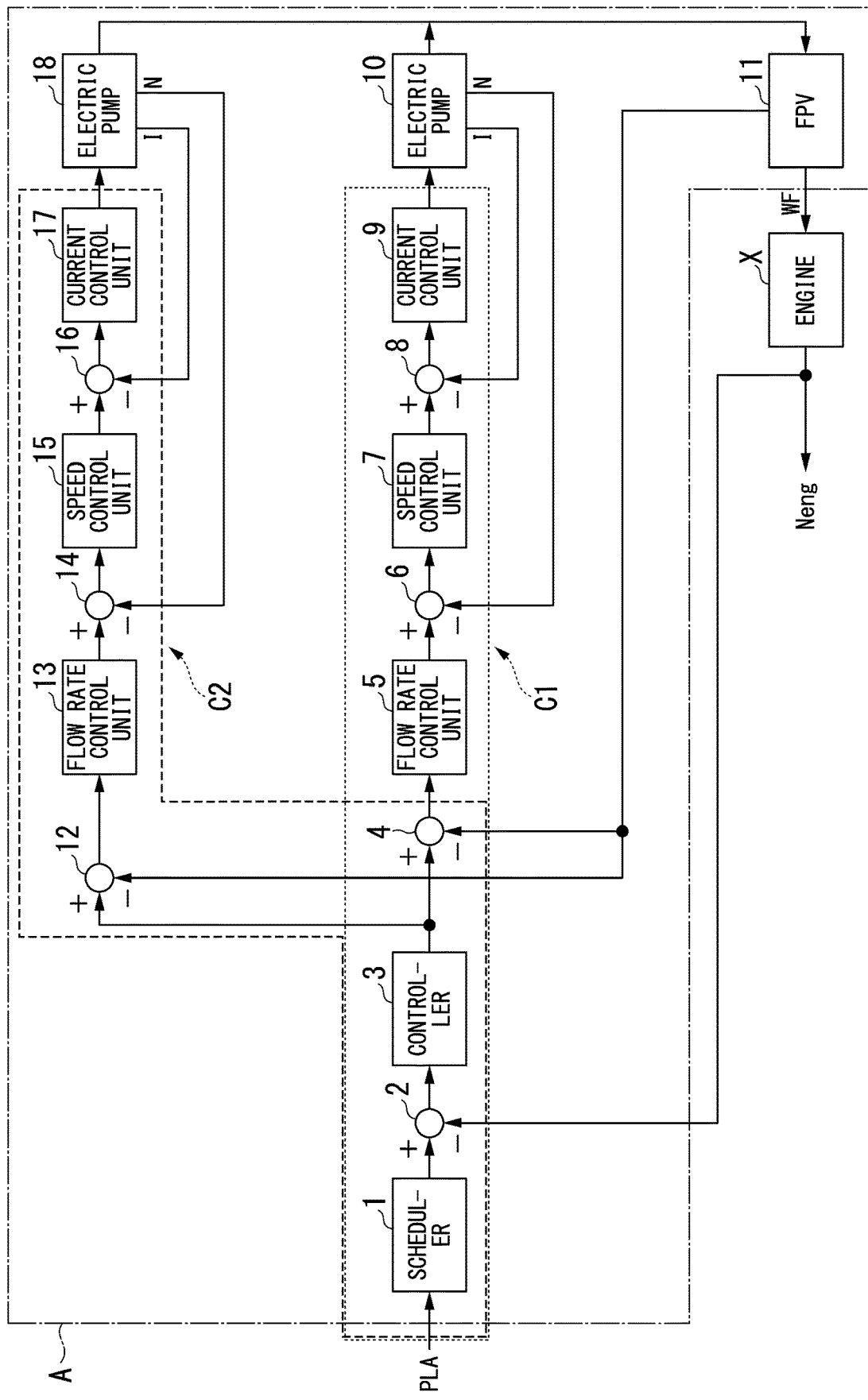
FIG. 1 is a block diagram showing a system configuration of a fuel supply device according to a first embodiment of the present disclosure.

First, a first embodiment of the present disclosure will be described with reference to FIG. 1. A fuel supply device A according to the first embodiment is a device which supplies a predetermined amount of fuel to an engine X, and as shown in FIG. 1, includes a scheduler 1, a subtractor 2, a controller 3, a subtractor 4, a flow rate control unit 5, a subtractor 6, a speed control unit 7, a subtractor 8, a current control unit 9, an electric pump 10 (first electric pump), an FPV 11 (flow rate measurement unit), a subtractor 12, a flow rate control unit 13, a subtractor 14, a speed control unit 15, a subtractor 16, a current control unit 17, and an electric pump 18 (second electric pump).

Among the components, the scheduler 1, the subtractor 2, the controller 3, the subtractor 4, the flow rate control unit 5, the subtractor 6, the speed control unit 7, the subtractor 8, and the current control unit 9 constitute a first control device C1 which controls the electric pump 10 (first electric pump). In addition, the scheduler 1, the subtractor 2, the controller 3, the subtractor 12, the flow rate control unit 13, the subtractor 14, the speed control unit 15, the subtractor 16, and the current control unit 17 constitute a second control device C2 which controls the electric pump 18 (second electric pump). For example, the engine X is a gas turbine which is a flight power source of an aircraft, but may be another type of internal combustion engine.

Although details will be described later, the fuel supply device A according to the first embodiment includes the electric pump 10 (first electric pump) which discharges a fuel toward the engine X at a first flow rate, the electric pump 18 (second electric pump) which discharges the fuel at a second flow rate and merges the fuel discharged at the second flow rate with the fuel discharged at the first flow rate, the first control device C1 which controls the electric pump 10 (first electric pump), and the second control device C2 which controls the electric pump 18 (second electric pump), in which the first control device C1 and the second control device C2 control the first electric pump 10 (first electric pump) and the second electric pump 18 (second electric pump) such that a total flow rate of the first flow rate and the second flow rate is a fuel flow rate target value.

The scheduler 1 generates an engine rotational speed target value based on a power level angle (PLA) of a pilot and outputs the engine rotational speed target value to the subtractor 2. The subtractor 2 is an arithmetic element which calculates a first difference (rotational speed error) between an actual engine rotational speed obtained from the engine X and the engine rotational speed target value input from the scheduler 1, and the subtractor 2 outputs the rotational speed error to the controller 3. The controller 3 generates the fuel flow rate target value to be supplied to the engine X based on the rotational speed error input from the subtractor 2, and outputs the fuel flow rate target value to the two subtractors 4 and 12.

The subtractor 4 is an arithmetic element which calculates a second difference (flow rate error) between the fuel flow rate target value input from the controller 3 and a measured value (actual flow rate of fuel) of an FPV 11 described later, and the subtractor 4 outputs the flow rate error to the flow rate control unit 5.

The flow rate control unit 5 performs a predetermined control operation on the flow rate error input from the subtractor 4 to generate a rotational speed target value of the electric pump 10, and outputs the rotational speed target value to the subtractor 6.

The subtractor 6 calculates a third difference (rotational speed error) between the rotational speed target value input from the flow rate control unit 5 and an actual rotational speed (pump rotational speed) input from the electric pump 10, and outputs the rotational speed error to the speed control unit 7. Here, the electric pump 10 may include a function of a tachometer which measures the pump rotational speed, or a tachometer (not shown) which measures the pump rotational speed may be provided separately from the electric pump 10.

Moreover, in the present specification, for example, the predetermined control operation may be any one of a PID calculation, a PI calculation, a P calculation, or the like, or may be control operations based on other control operation rules.

The speed control unit 7 performs a predetermined control operation on the rotational speed error input from the subtractor 6 to generate a drive current target value of the electric pump 10, and outputs the drive current target value to the subtractor 8.

The subtractor 8 calculates a fourth difference (drive current error) between the drive current target value input from the speed control unit 7 and an actual drive current value (pump drive current) input from the electric pump 10, and outputs the drive current error to the current control unit 9.

The current control unit 9 performs a predetermined control operation on the drive current error input from the subtractor 8 to generate a current operation amount indicating a drive current of the electrically connected electric pump 10, and outputs the current operation amount to the electric pump 10.

The electric pump 10 is a positive displacement pump which is rotationally driven by an electric motor. When a drive current corresponding to the current operation amount is input to the electric pump 10, the electric pump 10 discharges the fuel to the engine X in a rotation state corresponding to the current operation amount.

In addition, although not shown, a drive circuit (current amplification circuit) is provided between the current control unit 9 and the electric pump 10. The drive circuit supplies the drive current corresponding to the current operation amount to the electric pump 10.

The FPV 11 is a flow rate measurement unit which measures the total flow rate of the fuel discharged at the first flow rate which is a discharge flow rate of the electric pump 10 (first electric pump) and the fuel discharged at the second flow rate which is a discharge flow rate of the electric pump 18 (second electric pump). The FPV 11 is provided in a fuel supply flow path, that is, a fuel supply pipe through which the fuel is supplied to the engine X, and the FPV 11 measures a flow rate of the fuel flowing through the fuel supply pipe, that is, the total flow rate, and outputs a measured value to the two subtractors 4 and 12.

The subtractor 12 is an arithmetic element which calculates the second difference (flow rate error) between the fuel flow rate target value input from the controller 3 and the measured value (fuel flow rate) of the FPV 11, and the subtractor 12 outputs the flow rate error to the flow rate control unit 13.

The flow rate control unit 13 performs a predetermined control operation on the flow rate error input from the subtractor 12 to generate a rotational speed target value of the electric pump 18, and outputs the rotational speed target value to the subtractor 14.

The subtractor 14 calculates a fifth difference (rotational speed error) between the rotational speed target value input from the flow rate control unit 13 and an actual rotational speed (pump rotational speed) input from the electric pump 18 and outputs the rotational speed error to the speed control unit 15. Here, the electric pump 18 may include a function of a tachometer which measures the pump rotational speed, or a tachometer (not shown) which measures the pump rotational speed may be provided separately from the electric pump 18.

The speed control unit 15 performs a predetermined control operation on the rotational speed error input from the subtractor 14 to generate a drive current target value of the electric pump 18, and outputs the drive current target value to the subtractor 16.

The subtractor 16 calculates a sixth difference (drive current error) between the current target value input from the speed control unit 15 and an actual current value (pump drive current) input from the electric pump 18, and outputs the drive current error to the current control unit 17.

The current control unit 17 performs a predetermined control operation on the drive current error input from the subtractor 16 to generate a current operation amount indicating a drive current of the electrically connected electric pump 18, and outputs the current operation amount to the electric pump 18.

The electric pump 18 is a positive displacement pump which is rotationally driven by an electric motor. When a drive current corresponding to the current operation amount is input to the electric pump 18, the electric pump 18 discharges the fuel to the engine X in a rotation state corresponding to the current operation amount.

In addition, although not shown, a drive circuit (current amplification circuit) is provided between the current control unit 17 and the electric pump 18. This drive circuit supplies a drive current corresponding to the current operation amount to the electric pump 18.

Here, the scheduler 1, the subtractor 2, the controller 3, the subtractor 4, the flow rate control unit 5, the subtractor 6, the speed control unit 7, the subtractor 8, the current control unit 9, the subtractor 12, the flow rate control unit 13, the subtractor 14, the speed control unit 15, the subtractor 16, and the current control unit 17 may be a known computer including a CPU, a RAM, a ROM, or the like capable of performing the above-described calculations and controls. Details of the calculations and controls may be defined by software which can be optionally changed or updated by a user. As shown in FIG. 1, the members are electrically or electronically connected to each other so that signals can be transmitted and received.

That is, in the fuel supply device A according to the first embodiment, each of the first control device C1 controlling the electric pump 10 (first electric pump) and the second control device C2 controlling the electric pump 18 (second electric pump) has a quadruple feedback loop, that is, feedback loops related to the engine rotational speed, the fuel flow rate, the pump rotational speed, and the pump drive current.

Moreover, as described above, in the present disclosure, the scheduler 1, the subtractor 2, the controller 3, the subtractor 4, the flow rate control unit 5, the subtractor 6, the speed control unit 7, the subtractor 8, and the current control unit 9 constitute the first control device C1 which controls the electric pump 10, and the scheduler 1, the subtractor 2, the controller 3, the subtractor 12, the flow rate control unit 13, the subtractor 14, the speed control unit 15, the subtractor 16, and the current control unit 17 constitute a second control device C2 which controls the electric pump 18.

Therefore, in the present disclosure having the above-described configuration, the first control device C1 and the second control device C2 control the electric pump 10 and the electric pump 18 based on the first difference (rotational speed error) between the engine rotational speed obtained from the engine X and the engine rotational speed target value.

Further, in the present disclosure, the first control device C1 controls the electric pump 10 based on the fourth difference (drive current error) between the actual drive current value of the electric pump 10 and the drive current target value, and the second control device C2 controls the electric pump 18 based on the sixth difference (drive current error) between the actual drive current value of the electric pump 18 and the drive current target value.

Further, in the present disclosure, the first control device C1 controls the electric pump 10 based on the third difference (rotational speed error) between the actual rotational speed of the electric pump 10 and the rotational speed target value, and the second control device C2 controls the electric pump 18 based on the fifth difference (rotational speed error) between the actual rotational speed of the electric pump 18 and the rotational speed target value.

Further, in the present disclosure, the FPV 11 which measures the total flow rate is further provided, and the first control device C1 and the second control device C2 control the electric pump 10 and the electric pump 18 based on the second difference (flow rate error) between the actual fuel flow rate measured by the FPV 11 and the fuel flow rate target value.

Subsequently, an operation of the fuel supply device A according to the first embodiment will be described in detail.

As a basic operation, the fuel supply device A controls the electric pump 10 and the electric pump 18 such that the engine rotational speed, the flow rate of the fuel supplied to the engine X, the pump rotational speed, and the pump drive current are the same as the engine rotational speed target value, the fuel flow rate target value, the rotational speed target value, and the drive current target value, respectively. This control is a so-called feedback control.

Here, the total flow rate of the first flow rate and the second flow rate measured by the FPV 11 are input to the subtractor 4 of the first control device C1 and the subtractor 12 of the second control device C2. Accordingly, for example, if the first flow rate decreases, the second flow rate increases so that the total flow rate is maintained at the fuel flow rate target value.

That is, according to the fuel supply device A of the first embodiment, even when any one of the electric pump 10 (first electric pump) and the electric pump 18 (second electric pump) fails and any one of the first flow rate and the second flow rate is "zero", the total flow rate is maintained at the fuel flow rate target value. Therefore, according to the first embodiment, it is possible to provide the fuel supply device of the engine X capable of securing more redundancy than that of the related art.

Second Embodiment

Next, a fuel supply device B according to a second embodiment of the present disclosure will be described with reference to FIG. 2. In addition, in the following descriptions, in the fuel supply device B according to the second embodiment, the same reference signs are assigned to the same components as those of the fuel supply device A according to the above-described first embodiment, and repeated descriptions are omitted.

Figure 2:
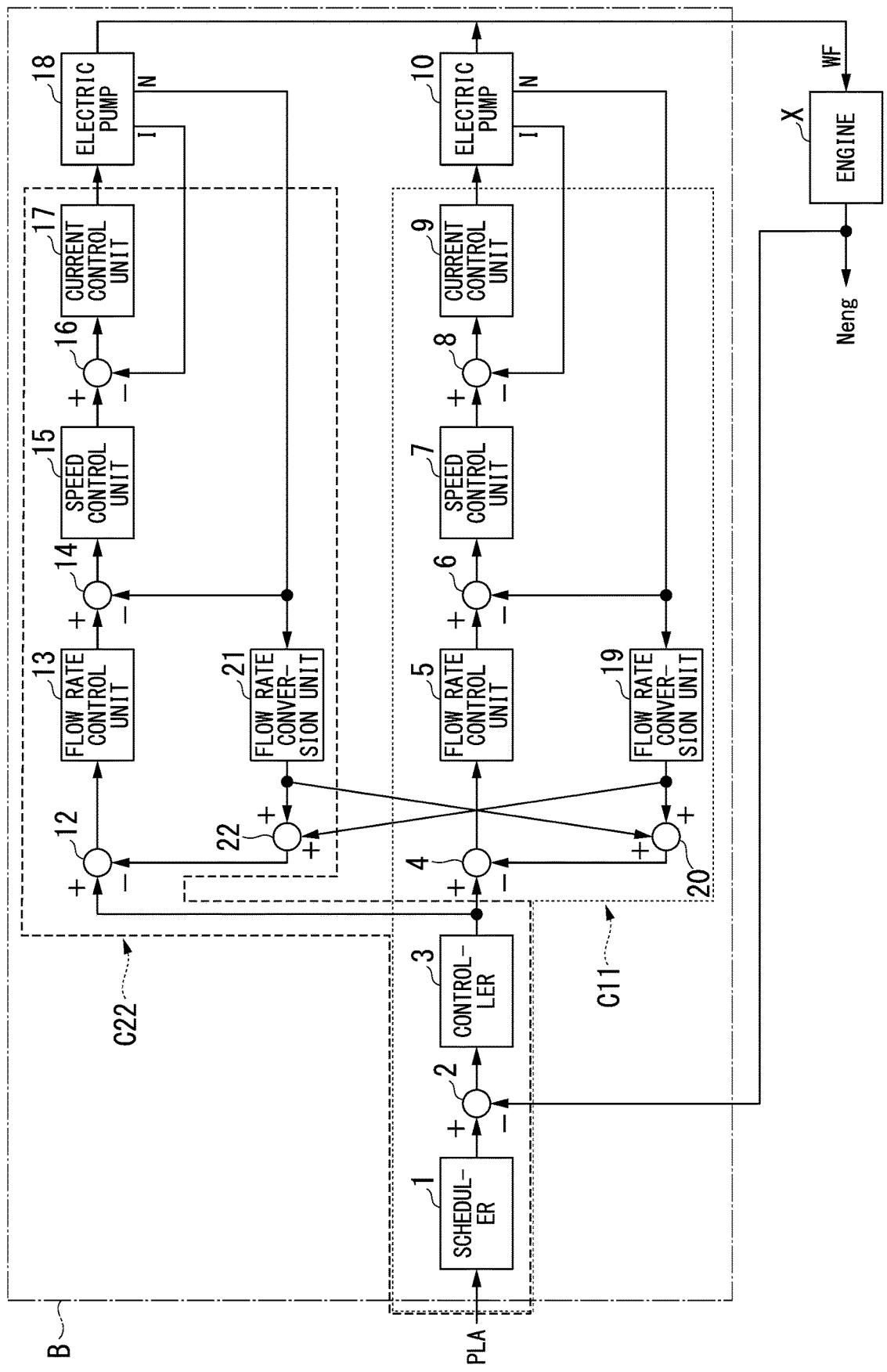
FIG. 2 is a block diagram showing a system configuration of a fuel supply device according to a second embodiment of the present disclosure.

As shown in FIG. 2, the fuel supply device B according to the second embodiment includes the scheduler 1, the subtractor 2, the controller 3, the subtractor 4, the flow rate control unit 5, the subtractor 6, the speed control unit 7, the subtractor 8, the current control unit 9, the electric pump 10 (first electric pump), the subtractor 12, the flow rate control unit 13, the subtractor 14, the speed control unit 15, the subtractor 16, the current control unit 17, the electric pump 18 (second electric pump), a flow rate conversion unit (first flow rate estimation unit) 19, an adder 20, a flow rate conversion unit (second flow rate estimation unit) 21, and an adder 22.

In the second embodiment, the scheduler 1, the subtractor 2, the controller 3, the subtractor 4, the flow rate control unit 5, the subtractor 6, the speed control unit 7, the subtractor 8, the current control unit 9, the flow rate conversion unit 19, and the adder 20 constitute a first control device C11 which controls the electric pump 10 (first electric pump). Moreover, the scheduler 1, the subtractor 2, the controller 3, the subtractor 12, the flow rate control unit 13, the subtractor 14, the speed control unit 15, the subtractor 16, the current control unit 17, the flow rate conversion unit 21, and the adder 22 constitute a second control device C22 which controls the electric pump 18 (second electric pump).

That is, the fuel supply device B has a configuration in which the FPV 11 is deleted in the fuel supply device A and the flow rate conversion unit 19 (first flow rate estimation unit), the adder 20, the flow rate conversion unit 21 (second flow rate estimation unit), and the adder 22 are added instead of the FPV 11.

The flow rate conversion unit 19 is the first flow rate estimation unit which acquires an estimated first flow rate which is an estimated value of the first flow rate supplied to the engine X based on the actual rotational speed (pump rotational speed) input from the electrically connected electric pump 10.

For example, the flow rate conversion unit 19 includes a flow rate conversion table indicating a relative relationship between the pump rotational speed and the first flow rate, and the flow rate conversion unit 19 searches the flow rate conversion table using the pump rotational speed input from the electric pump 10 to output the estimated first flow rate corresponding to the pump rotational speed to the two adders 20 and 22. The adder 20 calculates a total value of the estimated first flow rate input from the flow rate conversion unit 19 and an estimated second flow rate input from the flow rate conversion unit 21 described later, and outputs this total value to the subtractor 4 as an estimated fuel flow rate.

The subtractor 4 calculates the second difference (flow rate error) between the fuel flow rare target value input from the controller 3 and the estimated fuel flow rate input from the adder 20, and outputs the second difference to the flow rate control unit 5. The subsequent steps are the same as those of the first embodiment.

The flow rate conversion unit 21 is the second flow rate estimation unit which acquires an estimated second flow rate which is an estimated value of the second flow rate supplied to the engine X based on the actual rotational speed (pump rotational speed) input from the electrically connected electric pump 18.

For example, the flow rate conversion unit 21 includes a flow rate conversion table indicating a relative relationship between the pump rotational speed and the second flow rate, and the flow rate conversion unit 21 searches the flow rate conversion table using the pump rotational speed input from the electric pump 18 to output the estimated second flow rate corresponding to the pump rotational speed to the two adders 20 and 22. The adder 22 calculates a total value of the estimated first flow rate input from the flow rate conversion unit 19 and the estimated second flow rate input from the flow rate conversion unit 21, and outputs this total value to the subtractor 12 as an estimated fuel flow rate.

The subtractor 12 calculates the fifth difference (flow rate error) between the fuel flow rate target value input from the controller 3 and the estimated fuel flow rate input from the adder 22, and outputs the fifth difference to the flow rate control unit 13. The subsequent steps are the same as those of the first embodiment.

That is, in the second embodiment, the flow rate conversion unit (first flow rate estimation unit) 19 which acquires the estimated first flow rate which is the estimated value of the first flow rate from the rotational speed of the electric pump 10 and the flow rate conversion unit (second flow rate estimation unit) 21 which acquires the estimated second flow rate which is the estimated value of the second flow rate from the rotational speed of the electric pump 18 are further provided, and the first control device C11 and the second control device C22 control the electric pump 10 and the electric pump 18 based on a difference between the total flow rate of the estimated first flow rate and the estimated second flow rate and the fuel flow rate target value.

Here, the flow rate conversion unit 19, the adder 20, the flow rate conversion unit 21, and the adder 22 may be a known computer including a CPU, a RAM, a ROM, or the like capable of performing the above-described calculations and controls. Details of the calculations and controls may be defined by software which can be optionally changed or updated by a user. As shown in FIG. 2, the members are electrically or electronically connected to each other so that signals can be transmitted and received.

Subsequently, an operation of the fuel supply device B according to the second embodiment will be described in detail.

As a basic operation, the fuel supply device B controls the electric pump 10 and the electric pump 18 such that the engine rotational speed, the estimated fuel flow rate supplied to the engine X, the pump rotational speed, and the pump drive current are the same as the engine rotational speed target value, the fuel flow rate target value, the rotational speed target value, and the drive current target value, respectively. This control is a so-called feedback control.

Here, the estimated fuel flow rate which is the total flow rate of the estimated first flow rate calculated by the flow rate conversion unit 19 and the estimated second flow rate calculated by the flow rate conversion unit 21 is input to the subtractor 4 of the first control device C11 and the subtractor 12 of the second control device C22. Accordingly, for example, if the first flow rate decreases, the second flow rate increases so that the total flow rate is maintained at the fuel flow rate target value.

That is, according to the fuel supply device B of the second embodiment, even when any one of the electric pump 10 (first electric pump) and the electric pump 18 (second electric pump) fails and any one of the first flow rate and the second flow rate is "zero", the total flow rate is maintained at the fuel flow rate target value. Therefore, according to the second embodiment, it is possible to provide the fuel supply device of the gas turbine X capable of securing more redundancy than that of the related art.

In addition, the present disclosure is not limited to the embodiments, and for example, the following modification examples are considered.

(1) in the embodiments, each of the first control device C11 and the second control device C22 has a quadruple feedback loop, that is, feedback loops related to the engine rotational speed, the fuel flow rate, the pump rotational speed, and the pump drive current. However, the present disclosure is not limited to this. For example, the feedback loops related to the fuel flow rate and the pump rotational speed may be omitted as necessary.

(2) In the first embodiment, the FPV 11 is adopted as the flow rate measurement unit. However, the present disclosure is not limited to this. For example, as long as the flow rate measurement unit is a flow meter for a liquid, the flow rate measurement unit may adopt another type of flow meter.

INDUSTRIAL APPLICABILITY

According to the fuel supply device according to the present disclosure, it is possible to provide a fuel supply device of an engine capable of securing more redundancy than that of the related art.

What is claimed is:

1. A fuel supply device comprising:
   a first electric pump which discharges a fuel toward an engine at a first flow rate;
   a second electric pump which discharges the fuel at a second flow rate and merges the fuel discharged at the second flow rate with the fuel discharged at the first flow rate;
   a first control device which is configured to control the first electric pump;
   a second control device which is configured to control the second electric pump; and
   a flow rate measurement unit including circuitry connected to the first electric pump, the second electric pump, and the engine and electrically connected to a second subtractor and a fifth subtractor, the flow rate measurement unit being configured to measure a total flow rate of the first flow rate and the second flow rate,
   wherein the first control device includes a scheduler, a first subtractor which is electrically connected to the scheduler and the engine, a controller which is electrically connected to the first subtractor, the second subtractor which is electrically connected to the controller and the flow rate measurement unit, a first flow rate control unit which is electrically connected to the second subtractor, a third subtractor which is electrically connected to the first flow rate control unit and the first electric pump, a first speed control unit which is electrically connected to the third subtractor, a fourth subtractor which is electrically connected to the first speed control unit and the first electric pump, and a first current control unit which is electrically connected to the fourth subtractor,
   wherein the second control device includes the scheduler, the first subtractor, the controller, the fifth subtractor which is electrically connected to the controller and the flow rate measurement unit, a second flow rate control unit which is electrically connected to the fifth subtractor, a sixth subtractor which is electrically connected to the second flow rate control unit and the second electric pump, a second speed control unit which is electrically connected to the sixth subtractor, a seventh subtractor which is electrically connected to the second speed control unit and the second electric pump, and a second current control unit which is electrically connected to the seventh subtractor,
   wherein the first control device and the second control device are configured to control the first electric pump and the second electric pump such that the total flow rate of the first flow rate and the second flow rate is a fuel flow rate target value, and
   wherein the first control device and the second control device are configured to control the first electric pump and the second electric pump according to a difference between a measured value of the flow rate measurement unit and the fuel flow rate target value.

2. The fuel supply device according to claim 1,
   wherein the first control device and the second control device are configured to control the first electric pump and the second electric pump according to a difference between an engine rotational speed obtained from the engine and an engine rotational speed target value.

3. The fuel supply device according to claim 2,
   wherein the first control device is configured to control the first electric pump according to a difference between a drive current and a drive current target value of the first electric pump, and
   wherein the second control device is configured to control the second electric pump according to a difference between a drive current and a drive current target value of the second electric pump.

4. The fuel supply device according to claim 3,
   wherein the first control device is configured to control the first electric pump according to a difference between a rotational speed and a rotational speed target value of the first electric pump, and
   wherein the second control device is configured to control the second electric pump according to a difference between a rotational speed and a rotational speed target value of the second electric pump.

5. The fuel supply device according to claim 2,
   wherein the first control device is configured to control the first electric pump according to a difference between a rotational speed and a rotational speed target value of the first electric pump, and
   wherein the second control device is configured to control the second electric pump according to a difference between a rotational speed and a rotational speed target value of the second electric pump.

6. The fuel supply device according to claim 1,
   wherein the first control device is configured to control the first electric pump according to a difference between a drive current and a drive current target value of the first electric pump, and
   wherein the second control device is configured to control the second electric pump according to a difference between a drive current and a drive current target value of the second electric pump.

7. The fuel supply device according to claim 6,
   wherein the first control device is configured to control the first electric pump according to a difference between a rotational speed and a rotational speed target value of the first electric pump, and
   wherein the second control device is configured to control the second electric pump according to a difference between a rotational speed and a rotational speed target value of the second electric pump.

8. The fuel supply device according to claim 1,
   wherein the first control device is configured to control the first electric pump according to a difference between a rotational speed and a rotational speed target value of the first electric pump, and
   wherein the second control device is configured to control the second electric pump according to a difference between a rotational speed and a rotational speed target value of the second electric pump.

9. The fuel supply device according to claim 1, further comprising:
a first circuitry electrically connected to the first electric pump, a first adder, and a second adder, the first circuitry being configured to acquire an estimated first flow rate which is an estimated value of the first flow rate, from a rotational speed of the first electric pump; and
a second circuitry electrically connected to the second electric pump, the first adder, and the second adder, the second circuitry being configured to acquire an estimated second flow rate which is an estimated value of the second flow rate, from a rotational speed of the second electric pump,
wherein the first control device and the second control device are configured to control the first electric pump and the second electric pump according to a difference between a total flow rate of the estimated first flow rate and the estimated second flow rate, and the fuel flow rate target value.

10. The fuel supply device according to claim 9,
wherein the first control device includes a scheduler, a first subtractor which is electrically connected to the scheduler and the engine, a controller which is electrically connected to the first subtractor, a second subtractor which is electrically connected to the controller and the first adder, a first flow rate control unit which is electrically connected to the second subtractor, a third subtractor which is electrically connected to the first flow rate control unit and the first electric pump, a first speed control unit which is electrically connected to the third subtractor, a fourth subtractor which is electrically connected to the first speed control unit and the first electric pump, a first current control unit which is electrically connected to the fourth subtractor, the first circuitry which is electrically connected to the first electric pump, and the first adder which is electrically connected to the first circuitry and the second circuitry, and
wherein the second control device includes the scheduler, the first subtractor, the controller, a fifth subtractor which is electrically connected to the controller and the second adder, a second flow rate control unit which is electrically connected to the fifth subtractor, a sixth subtractor which is electrically connected to the second flow rate control unit and the second electric pump, a second speed control unit which is electrically connected to the sixth subtractor, a seventh subtractor which is electrically connected to the second speed control unit and the second electric pump, a second current control unit which is electrically connected to the seventh subtractor, the second circuitry which is electrically connected to the second electric pump, and the second adder which is electrically connected the second circuitry and the first circuitry.

11. The fuel supply device according to claim 10,
wherein the first subtractor is configured to calculate a first difference between an engine rotational speed target value input from the scheduler and an engine rotational speed input from the engine, and output the first difference to the controller,
wherein the second subtractor is configured to calculate a second difference between the fuel flow rate target value input from the controller and an estimated fuel flow rate input from the first adder, and output the second difference to the first flow rate control unit,
wherein the third subtractor is configured to calculate a third difference between a rotational speed target value input from the first flow rate control unit and a pump rotational speed input from the first electric pump, and output the third difference to the first speed control unit,
wherein the fourth subtractor is configured to calculate a fourth difference between a drive current target value of the first electric pump input from the first speed control unit and a pump drive current input from the first electric pump, and output the fourth difference to the first current control unit,
wherein the first adder is configured to calculate a total value of the estimated first flow rate input from the first circuitry and the estimated second flow rate input from the second circuitry, and input the total value to the second subtractor,
wherein the fifth subtractor is configured to calculate a fifth difference between the fuel flow rate target value input from the controller and an estimated fuel flow rate input from the second adder, and output the fifth difference to the second flow rate control unit,
wherein the sixth subtractor is configured to calculate a sixth difference between a rotational speed target value input from the second flow rate control unit and a pump rotational speed input from the second electric pump, and output the sixth difference to the second speed control unit,
wherein the seventh subtractor is configured to calculate a seventh difference between a drive current target value of the second electric pump input from the second speed control unit and a pump drive current input from the second electric pump, and output the seventh difference to the second current control unit, and
wherein the second adder is configured to calculate the total value of the estimated second flow rate input from the second circuitry and the estimated first flow rate input from the first circuitry, and input the total value to the fifth subtractor.

12. A fuel supply device, comprising:
a first electric pump which discharges a fuel toward an engine at a first flow rate;
a second electric pump which discharges the fuel at a second flow rate and merges the fuel discharged at the second flow rate with the fuel discharged at the first flow rate;
a first control device which is configured to control the first electric pump;
a second control device which is configured to control the second electric pump; and
a flow rate measurement unit including circuitry connected to the first electric pump, the second electric pump, and the engine and electrically connected to a second subtractor and a fifth subtractor, the flow rate measurement unit being configured to measure a total flow rate of the first flow rate and the second flow rate,
wherein the first control device includes a scheduler, a first subtractor which is electrically connected to the scheduler and the engine, a controller which is electrically connected to the first subtractor, the second subtractor which is electrically connected to the controller and the flow rate measurement unit, a first flow rate control unit which is electrically connected to the second subtractor, a third subtractor which is electrically connected to the first flow rate control unit and the first electric pump, a first speed control unit which is electrically connected to the third subtractor, a fourth subtractor which is electrically connected to the first speed control unit and the first electric pump, and a first current control unit which is electrically connected to the fourth subtractor, wherein the second control device includes the scheduler, the first subtractor, the controller, the fifth subtractor which is electrically connected to the controller and the flow rate measurement unit, a second flow rate control unit which is electrically connected to the fifth subtractor, a sixth subtractor which is electrically connected to the second flow rate control unit and the second electric pump, a second speed control unit which is electrically connected to the sixth subtractor, a seventh subtractor which is electrically connected to the second speed control unit and the second electric pump, and a second current control unit which is electrically connected to the seventh subtractor, wherein the first control device and the second control device are configured to control the first electric pump and the second electric pump such that the total flow rate is a fuel flow rate target value, wherein the first control device and the second control device are configured to control the first electric pump and the second electric pump according to a difference between a measured value of the flow rate measurement unit and the fuel flow rate target value, wherein the first subtractor is configured to calculate a first difference between an engine rotational speed target value input from the scheduler and an engine rotational speed input from the engine and output the first difference to the controller, wherein the second subtractor is configured to calculate a second difference between the fuel flow rate target value input from the controller and a fuel flow rate input from the flow rate measurement unit, and output the second difference to the first flow rate control unit, wherein the third subtractor is configured to calculate a third difference between a rotational speed target value input from the first flow rate control unit and a pump rotational speed input from the first electric pump, and output the third difference to the first speed control unit, wherein the fourth subtractor is configured to calculate a fourth difference between a drive current target value of the first electric pump input from the first speed control unit and a pump drive current input from the first electric pump, and output the fourth difference to the first current control unit, wherein the fifth subtractor is configured to calculate the second difference between the fuel flow rate target value input from the controller and the fuel flow rate input from the FPV flow rate measurement unit, and output the second difference to the second flow rate control unit, wherein the sixth subtractor is configured to calculate a fifth difference between a rotational speed target value input from the second flow rate control unit and a pump rotational speed input from the second electric pump, and output the fifth difference to the second speed control unit, and wherein the seventh subtractor is configured to calculate a sixth difference between a drive current target value of the second electric pump input from the second speed control unit and a pump drive current input from the second electric pump, and output the sixth difference to the second current control unit.

* * * * *